(12) United States Patent
Jarsch

(10) Patent No.: US 12,214,466 B2
(45) Date of Patent: Feb. 4, 2025

(54) UNLOADING STATION FOR A METAL-CUTTING MACHINE AND METAL-CUTTING MACHINE FOR CUTTING TUBULAR OR BAR-SHAPED WORKPIECES

(71) Applicant: TRUMPF WERKZEUGMASCHINEN SE + CO. KG, Ditzingen (DE)

(72) Inventor: Florian Jarsch, Ditzingen (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 0 days.

(21) Appl. No.: 18/318,808

(22) Filed: May 17, 2023

(65) Prior Publication Data

US 2023/0286093 A1 Sep. 14, 2023

Related U.S. Application Data

(63) Continuation of application No. PCT/EP2021/082223, filed on Nov. 18, 2021.

(30) Foreign Application Priority Data

Nov. 19, 2020 (DE) ..................... 10 2020 130 607.5

(51) Int. Cl.
*B23Q 7/14* (2006.01)
*B23Q 7/16* (2006.01)

(52) U.S. Cl.
CPC ............. *B23Q 7/1447* (2013.01); *B23Q 7/16* (2013.01)

(58) Field of Classification Search
CPC ...... B23K 26/38; B23K 26/70; B23K 37/047; B23D 47/042; B23Q 7/05; B23Q 7/06;
(Continued)

(56) References Cited

U.S. PATENT DOCUMENTS

| 4,462,749 A | * | 7/1984 | Crocker | ................. | E21B 19/155 |
| | | | | | 414/745.9 |
| 6,168,006 B1 | * | 1/2001 | Bytow | .................... | B23Q 7/003 |
| | | | | | 198/360 |

(Continued)

FOREIGN PATENT DOCUMENTS

| CN | 110142522 B | 4/2020 |
| DE | 202008014371 U1 | 4/2010 |

(Continued)

*Primary Examiner* — Gregory W Adams
(74) *Attorney, Agent, or Firm* — Laurence A. Greenberg; Werner H. Stemer; Ralph E. Locher

(57) ABSTRACT

An unloading station for a metal-cutting station and a metal-cutting machine for cutting tubular or bar-shaped workpieces. The unloading station has an unloading installation which receives workpieces guided out of a metal-cutting station and one or more workpiece supports into which the workpiece can be transferred from the unloading installation. A discharging installation for selectively discharging workpieces from the unloading installation has a longitudinal conveyor installation that extends at least between the unloading installation and the workpiece support, and which includes a workpiece turnout by way of which the workpiece delivered from the unloading installation can be selectively transferred into the longitudinal conveyor installation or onto the workpiece support.

18 Claims, 7 Drawing Sheets

(58) Field of Classification Search
CPC .......... B23Q 7/08; B23Q 7/12; B23Q 7/1447; B23Q 7/16; Y10T 83/2198
See application file for complete search history.

(56) References Cited

U.S. PATENT DOCUMENTS

| | | | |
|---|---|---|---|
| 6,901,832 B2* | 6/2005 | Stolzer | B23Q 7/06 |
| | | | 83/29 |
| 10,023,404 B2* | 7/2018 | Schopf | B23K 37/047 |
| 2012/0219396 A1* | 8/2012 | Schopf | B23K 37/053 |
| | | | 414/806 |

FOREIGN PATENT DOCUMENTS

| | | | | |
|---|---|---|---|---|
| EP | 2827206 A2 | 1/2015 | | |
| JP | S60157720 U | 10/1985 | | |
| JP | S61260901 A | 11/1986 | | |
| JP | H06255746 A | 9/1994 | | |
| KR | 102031883 B1 * | 11/2019 | ............... | B23Q 7/05 |

\* cited by examiner

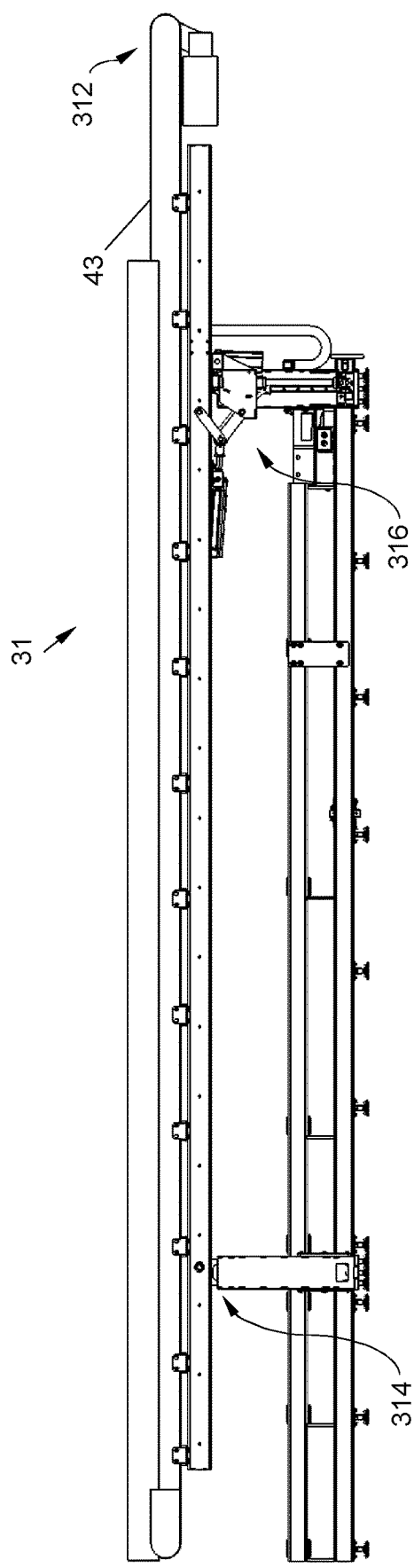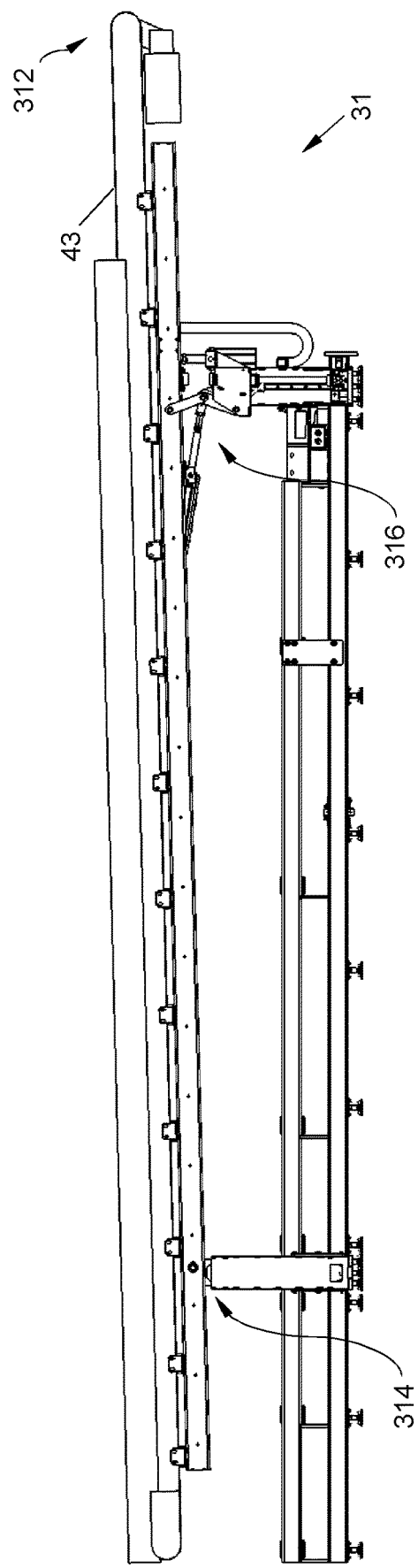
FIG. 9A
FIG. 9B

UNLOADING STATION FOR A METAL-CUTTING MACHINE AND METAL-CUTTING MACHINE FOR CUTTING TUBULAR OR BAR-SHAPED WORKPIECES

CROSS-REFERENCE TO RELATED APPLICATION

This application is a continuation, under 35 U.S.C. § 120, of copending International Patent Application PCT/EP2021/082223, filed Nov. 18, 2021, which designated the United States; this application also claims the priority, under 35 U.S.C. § 119, of German Patent Application DE 10 2020 130 607.5, filed Nov. 19, 2020; the prior applications are herewith incorporated by reference in their entirety.

FIELD AND BACKGROUND OF THE INVENTION

The invention relates to an unloading station for a metal-cutting machine for cutting tubular or bar-shaped workpieces, and to such a metal-cutting machine.

A metal-cutting machine for cutting bar-shaped or tubular workpieces is known from EP 2 827 206 A1. This metal-cutting machine comprises a loading station for receiving workpieces to be machined. The workpieces are supplied to the metal-cutting station from this loading station. Cutting or subtractive machining of the workpiece to be machined can then take place in the metal-cutting station, for example by means of subtractive tools and/or by means of a cutting beam, in particular a laser beam. After the workpiece has been machined, the workpiece is guided out of the metal-cutting station and transferred to a downstream unloading station. The workpieces transferred into the unloading station can be laterally discharged in that the workpieces are transferred to a workpiece support which is laterally contiguous to the unloading station. This workpiece support can receive a plurality of machined workpieces. The workpieces are manually retrieved from this workpiece support and transferred into a magazine or an intermediate store.

SUMMARY OF THE INVENTION

It is accordingly an object of the invention to provide a metal-cutting machine and an unloading station which overcomes a variety of the disadvantages of the heretofore-known devices and methods of this general type and which provides for an unloading station for a metal-cutting machine and a metal-cutting machine for cutting tubular or bar-shaped workpieces, by way of which the productivity in the machining of the bar-shaped or tubular workpieces is increased.

With the above and other objects in view there is provided, in accordance with the invention, an unloading station for a metal-cutting station for cutting tubular or bar-shaped workpieces, the unloading station comprising:

an unloading installation configured to receive workpieces guided out of the metal-cutting station;
a discharging installation for selectively discharging workpieces from the unloading installation; and
at least one workpiece support configured to receive the at least one workpiece to be transferred from the unloading installation;
the discharging installation including a longitudinal conveyor installation that extends at least between the unloading installation and the at least one workpiece support; and the discharging installation including a workpiece turnout configured to enable the workpiece delivered from the unloading installation to be selectively transferred into the longitudinal conveyor installation or onto the at least one workpiece support.

In other words, the objects of the invention are achieved by an unloading station for a metal-cutting machine, which has a discharging installation for selectively discharging machined workpieces from the unloading installation. The discharging installation comprises a longitudinal conveyor installation that extends at least between the unloading installation and the workpiece support, and which comprises a workpiece turnout by way of which the workpiece to be guided out of the unloading installation is able to be transferred into the longitudinal conveyor installation or onto the workpiece support. As a result of the additional possibility of discharging the machined workpieces onto a longitudinal conveyor installation, this enables a second transport path for guiding the machined workpieces out of the unloading installation to be achieved. It can preferably be provided that a handling installation is provided at the end of the longitudinal conveyor installation, by way of which an automated retrieval of the workpiece from the longitudinal conveyor installation takes place.

It is preferably provided that the discharging installation is provided on one or both longitudinal sides of the unloading installation. It is made possible as a result that a high storage capacity in terms of receiving machined workpieces is provided, as a result of which a rapid delivery of machined workpieces from the unloading installation is also made possible.

The workpiece turnout of the discharging installation preferably has a guide face which, for transferring the machined workpiece from the unloading installation to the workpiece support, closes a gap formed by the longitudinal conveyor installation. As a result, the delivery of the machined workpieces can be made possible, as to date, directly at workpiece supports assigned to the unloading installation.

According to one preferred embodiment, the workpiece turnout is configured as a stop beam which is displaceable along the workpiece support. Simple actuating of a workpiece turnout is made possible as a result. Moreover, such a workpiece turnout can also extend over a great length along the unloading installation. For example, tubular or bar-shaped workpieces with a length of 4 to 6 m are machined.

The workpiece turnout, which is configured as a stop beam, preferably comprises the guide face and a stop face, wherein in a closed position of the stop beam relative to the longitudinal conveyor installation the guide face closes the gap between the unloading installation and the workpiece support, and in a discharging position of the stop beam the stop face transfers the machined workpiece into the longitudinal conveyor installation. The workpiece turnout can be actuatable by a simple repositioning or displacing movement.

It is advantageously provided that the stop beam is configured so as to be triangular, in particular in the form of a right-angled triangle, wherein the stop face is aligned vertically and the guide face, proceeding from the highest point of the stop face, is aligned so as to slope. This represents a design which is simple in terms of construction.

It is furthermore preferably provided that the stop beam is actuated so as to be displaceable by guides which preferably extend orthogonally to the longitudinal side of the unloading installation and in particular are contiguous to the workpiece support and/or are positioned between the two adjacent workpiece supports. This makes it possible for comparatively great lengths of the stop beam to also be guided in a displaceable manner. Sufficient support of the stop beam can also be made possible when transferring the workpiece from the unloading installation onto the workpiece support.

The stop beam of a predetermined length and with at least two supports preferably forms a basic module. Extension or add-on modules which on the stop beams have at least one guide of a further predetermined length can furthermore be provided. As a result, the discharging installation can be flexibly adapted to different lengths of the unloading installations. The guides, preferably on this upper region, can have at least one workpiece support portion. A support for comparatively long workpieces can also be provided as a result.

According to an alternative embodiment, the workpiece turnout can be configured as a pivotable flap which is positioned between the longitudinal conveyor installation and the workpiece support. Such pivotable flaps enable a simple mechanical construction and are cost-effective in terms of actuation.

It is preferably provided that an upper side of the pivotable flap is configured as a guide face for closing the gap between the longitudinal conveyor installation and the workpiece support, and a lower side of the pivotable flap is configured as a stop which enables a transfer of the machined workpiece from the unloading installation onto the workpiece support. According to one preferred simple design embodiment the pivotable flap can be configured so as to be plate-shaped.

According to a further preferred embodiment it is provided that the longitudinal conveyor installation is displaceable in terms of height. As a result, this can enable an adaptation to different sizes of diameters of the tubular or bar-shaped workpiece, so as to reduce the drop height from the unloading installation onto the longitudinal conveyor installation during discharging. As a result, damages to the machined workpiece can also be reduced. Moreover, a reduction in terms of noise can also be made possible.

According to one preferred design embodiment of the longitudinal conveyor installation it is provided that a stop which in terms of height is displaceable conjointly with the longitudinal conveyor installation is provided so as to be contiguous to the workpiece support. In combination with the above-described stop beam, for example, it can be made possible that the transport plane of the longitudinal conveyor installation can be positioned so as to be almost flush with a delivery face provided on the unloading installation, but a transfer onto the workpiece support is nevertheless prevented.

Alternatively or additionally, the transport plane of the longitudinal conveyor installation can be configured so as to be inclinable. In other words, it can be provided that by means of a lifting device of the longitudinal conveyor installation an unloading-proximal end of the transport plane can be lifted at an unloading-proximal bearing point of the transport plane, wherein the transport plane is mounted so as to be rotatable about a machining-proximal bearing point. The longitudinal conveyor installation can comprise a transport belt, the surface of the latter forming the transport plane of the longitudinal conveyor installation. As a result of the height adjustability of the unloading-proximal end of the transport plane the transfer position of a workpiece can be adapted in a simple manner to the height of a transport or storage unit (e.g. a pallet or a stanchion rack).

It is preferably provided that the unloading installation along the longitudinal side has connection interfaces for assembling the longitudinal conveyor installation and/or the guides for the stop beam and/or the workpiece support. A modular construction is provided as a result. A flexible adaptation to different lengths of the unloading installation can also be enabled.

With the above and other objects in view there is also provided, in accordance with the invention, a metal-cutting machine for bar-shaped or tubular workpieces, which has a loading station for receiving workpieces to be machined, from which loading station the workpiece for machining is supplied to a metal-cutting station, and which metal-cutting machine has an unloading station which is disposed downstream of the metal-cutting station into which machined workpieces are able to be transferred, wherein the unloading station comprises at least one discharging installation according to one of the above-described embodiments.

Other features which are considered as characteristic for the invention are set forth in the appended claims.

Although the invention is illustrated and described herein as embodied in an unloading station for a metal-cutting machine and metal-cutting machine for cutting tubular or bar-shaped workpieces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIGS. 9A and 9B show the front view of a longitudinal conveyor installation having a transport plane aligned in parallel (FIG. 9A) and having an inclined transport plane (FIG. 9B).

DETAILED DESCRIPTION OF THE INVENTION

Figure 1:
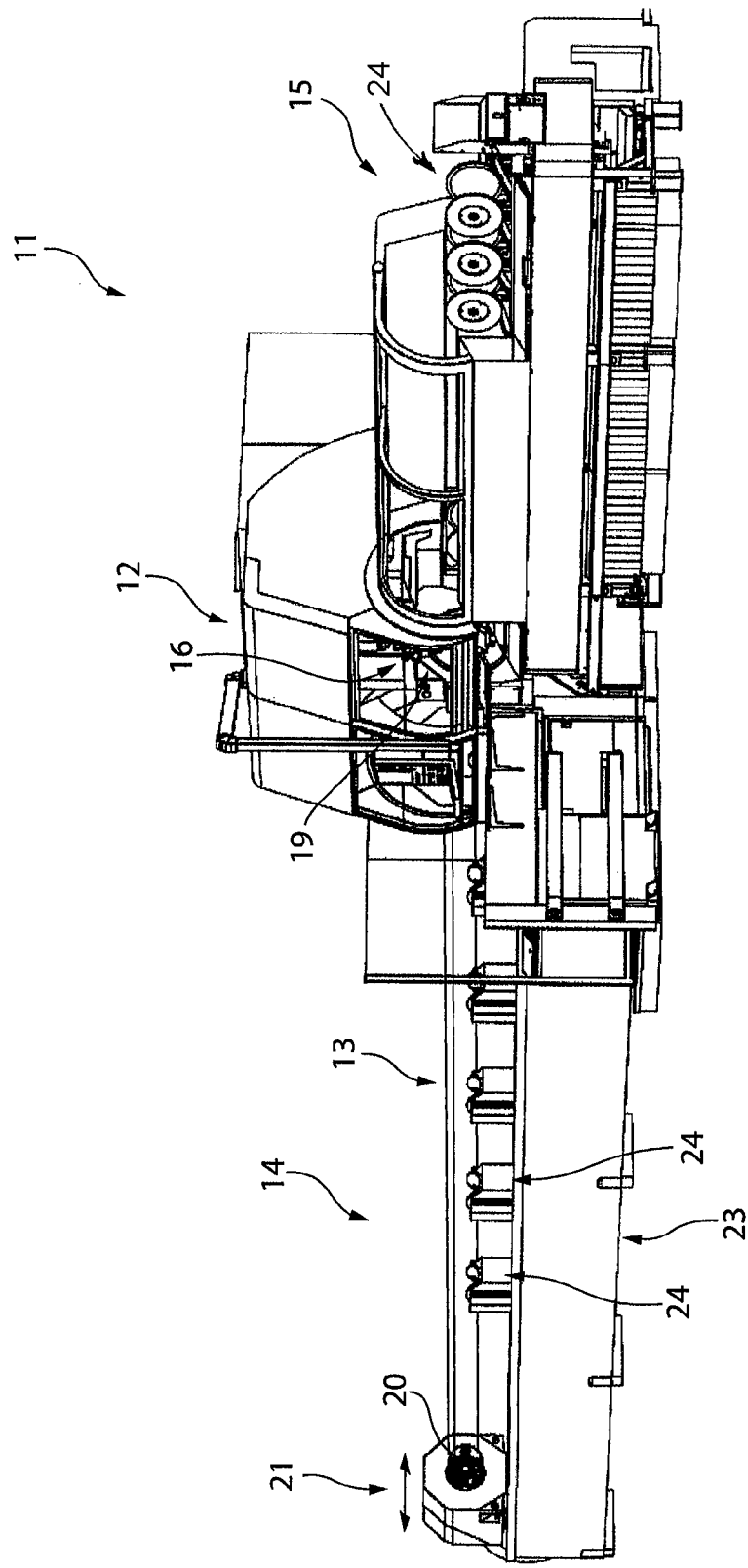
FIG. 1 shows a perspective view of a metal-cutting machine for cutting tubular or bar-shaped workpieces.

Referring now to the figures of the drawing in detail and first, in particular, to FIG. 1 thereof, there is shown a perspective view of a metal-cutting machine 11 for cutting tubular or bar-shaped workpieces 13. Tubular or bar-shaped workpieces 13 are understood to mean elongate members, the length of the latter typically being substantially greater than the cross section of the latter, and which are made from a substantially inflexible material. Such workpieces 13 may have arbitrary open or closed cross-sectional shapes and/or profiles. Round or rectangular tubes are the most common.

The metal-cutting machine 11 for machining the workpieces 13 has a metal-cutting station 12, in particular a laser cutting station, and a loading station 14 and an unloading station 15. A laser cutting head 16 is provided in the laser cutting station 12 by way of which the workpieces 13 are cut to length so as to form tubular pieces, not illustrated in more detail, and/or additionally machined. The workpieces 13 are mounted close to the machining point in a slide-through chuck 19. Opposite thereto, the workpiece 13 is received in a rotating and advancing installation 21 which in the manner required for machining is displaceable along a machine main frame 23 relative to the laser cutting head 16 in the laser cutting station 12. In detail, the workpieces 13 to be machined, by means of the rotating and advancing station 11, are infed in the longitudinal direction of the tube in relation to the laser cutting head 16 and for generating a separating cut rotated about the longitudinal axis of the tube. The workpieces 13 between the rotating and advancing installation 21 and the slide-through chuck 19 are mounted on tube supports 24. As the machining of the tubular workpieces progresses, the tube supports 24 are lowered into the machine frame 23 and can then be travelled across by the rotating and advancing installation 21.

Figure 2:
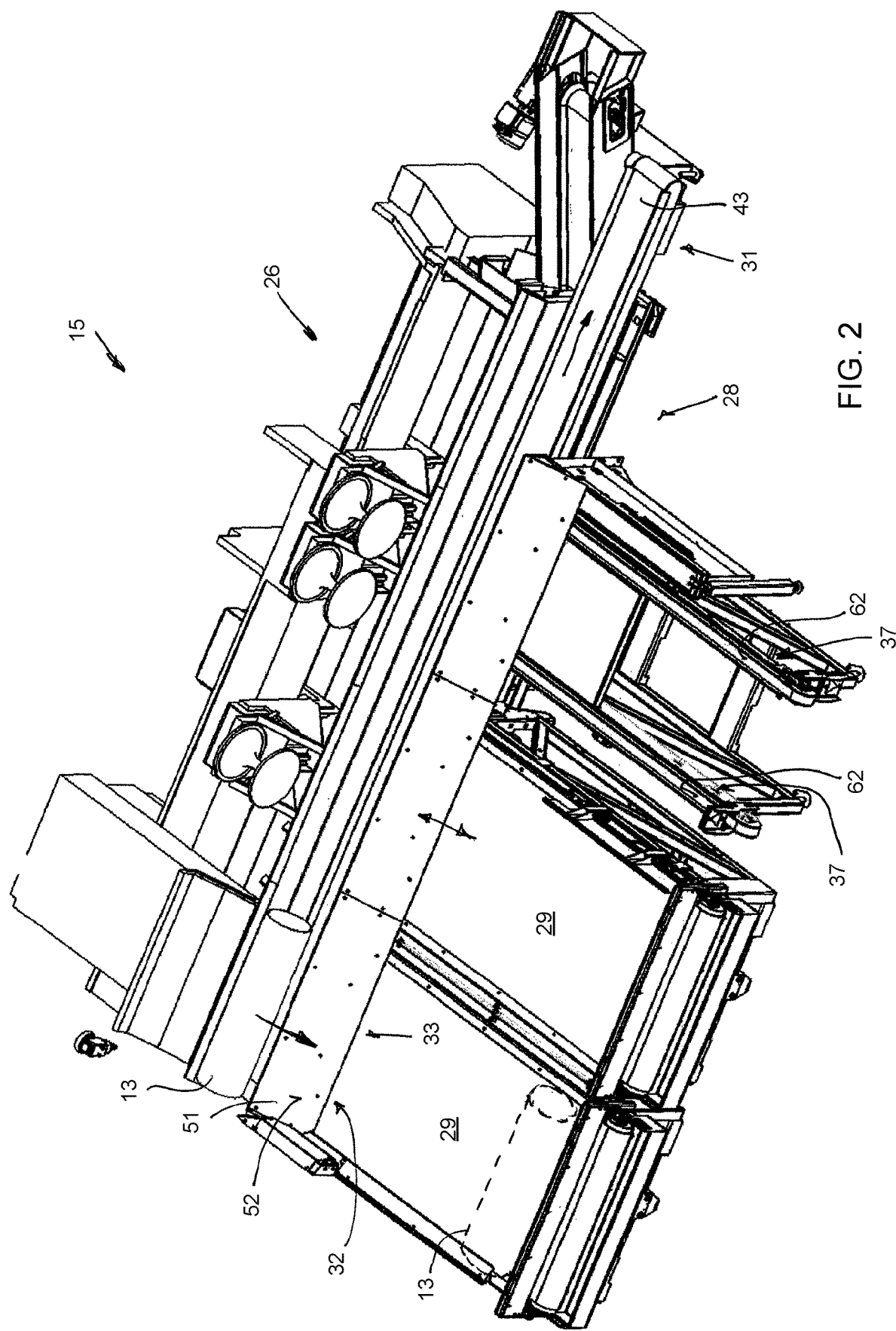
FIG. 2 shows a perspective view onto an unloading station having an unloading installation and a discharging installation.
Figure 4:
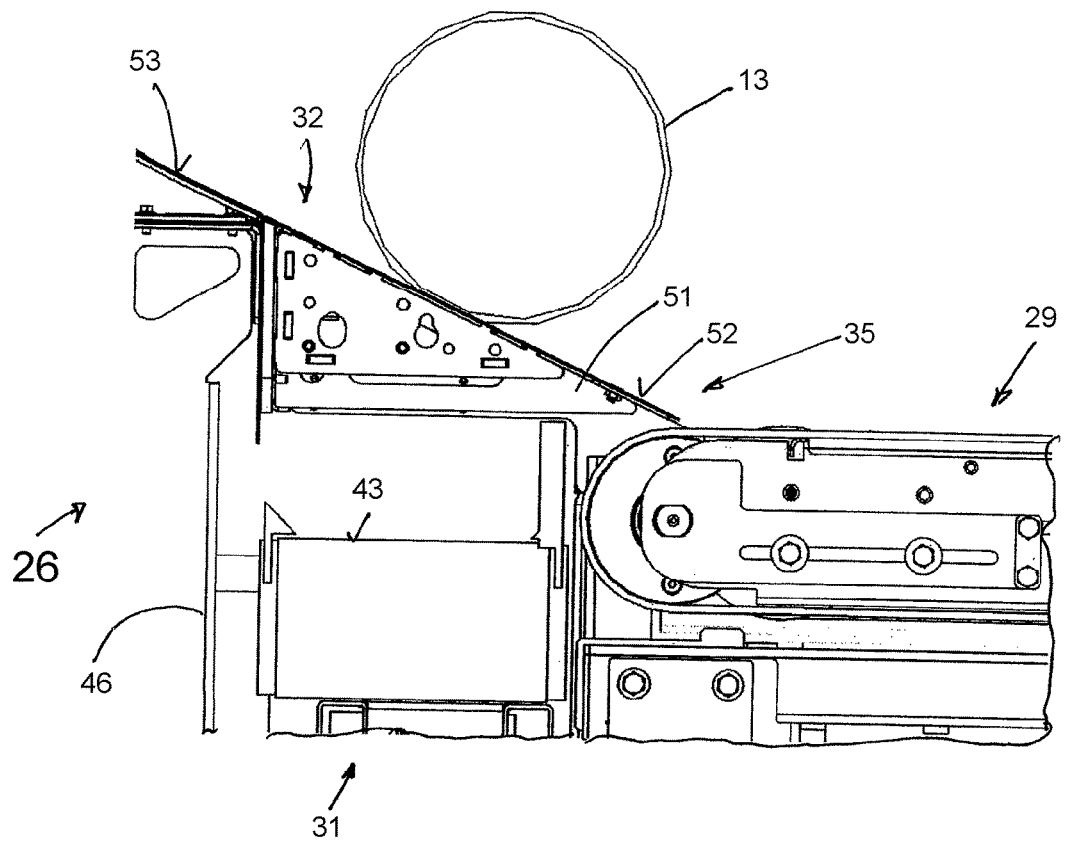
FIG. 4 shows a schematic sectional view of the discharging installation in a closed position.

FIG. 2 illustrates a perspective view onto the unloading station 15. The unloading station 15 comprises an unloading installation 26 which receives the machined workpieces 13 guided out of the metal-cutting station 12. A discharging installation 28, by way of which the machined workpieces 13 are able to be transferred onto at least one workpiece support 29, for example, is provided laterally of the unloading installation 26. The discharging installation 28 comprises a longitudinal conveyor installation 31 which is positioned, and in particular fixed, along a longitudinal side of the unloading installation 26. The longitudinal conveyor installation 31 is provided between the unloading installation 26 and the workpiece support 29. The discharging installation 28 furthermore comprises a workpiece turnout 32 of a switch device which is able to be transferred from a discharging position 33 illustrated in FIG. 2 to a closed position 35 (FIG. 4). In the discharging position 33 of the workpiece turnout 32, the machined workpiece 13 is transferred onto the longitudinal conveyor installation 31 and subsequently guided out of the unloading station 15 in the longitudinal direction of the longitudinal conveyor installation 31. At least one handling installation, in particular a gantry robot, can be provided for automated unloading at the end of the unloading station 15, so as to be assigned to the longitudinal conveyor installation 31.

The workpiece turnout 32 is guided so as to be displaceable between the discharging position 33 and the closed position 35. Provided to this end are guides 37 which are contiguous to the workpiece support 29 and/or else are provided between two adjacent workpiece supports 29. For example, one guide 37 can be configured in the form of a fixed bearing, and an adjacent guide can be configured in the form of a floating bearing. The displacement movement of the workpiece turnout 32 can take place by way of a motorized drive and/or by way of a lifting cylinder, a linear drive, or the like.

The workpiece turnout 32 extends along the unloading installation 26. A continuously flat face is preferably provided on an upper side of the workpiece turnout 32.

Figure 3:
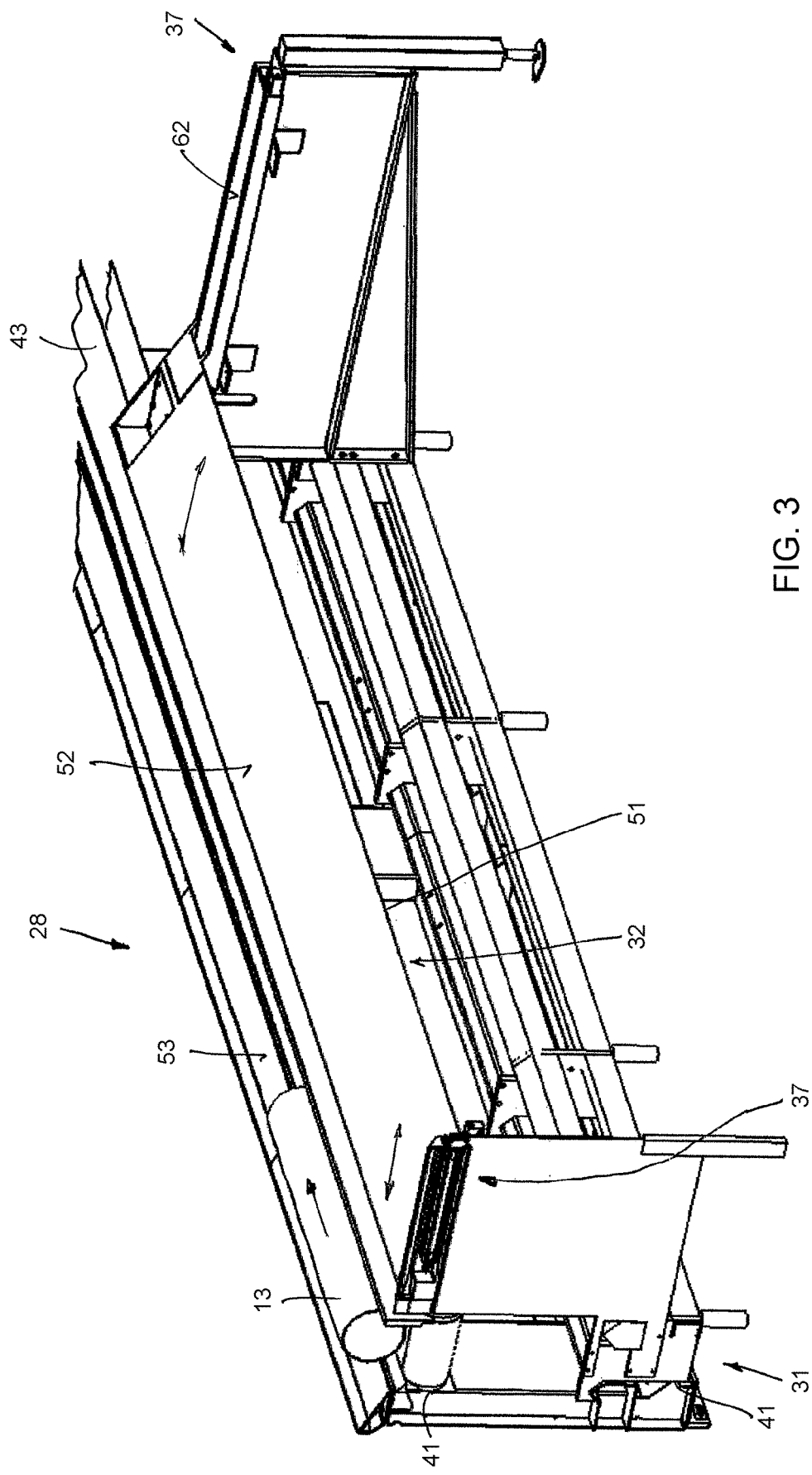
FIG. 3 shows a further perspective view onto the discharging installation according to FIG. 2.

FIG. 3 illustrates a further perspective view of the discharging installation 28. This discharging installation 28 preferably has assembly interfaces 41 so that the longitudinal conveyor installation 31 is able to be assembled in a simple manner on the unloading installation 26, and also the guides 37 are able to be assembled on the longitudinal conveyor installation 31, for example. The same applies in an analogous manner to the workpiece support 29 not illustrated in more detail in FIG. 3.

The longitudinal conveyor installation 31 is preferably configured with a revolving transport belt 43. This has the advantage that an individual adaptation to the length of the unloading installation 26 in a simple manner is provided. The length of the longitudinal conveyor installation 31 is preferably configured so as to be longer than the length of the unloading installation 26. In contrast, the length of the workpiece turnout 32 can be configured so as to be equal to or shorter than the length of the unloading installation 26.

FIG. 4 illustrates a schematic sectional view of the discharging installation 28 according to FIG. 2. The longitudinal conveyor installation 31 is positioned between a main frame 46 of the unloading installation 26 and the workpiece support 29. The workpiece turnout 32 in this embodiment is embodied as a so-called stop beam 51. This stop beam 51 has an inclined or sloping guide face 52 which in the closed position 35 closes a gap between a delivery face 53 of the retrieval installation 26 and the workpiece support 29. The guide face 52 is preferably contiguous to the delivery face 53 so as to be flush with the latter. The longitudinal conveyor installation 31 is disposed below the plane of the workpiece support 29 so that a transfer to the closed position 35 is made possible by a rectilinear displacement movement of the stop beam 51.

Figure 5:
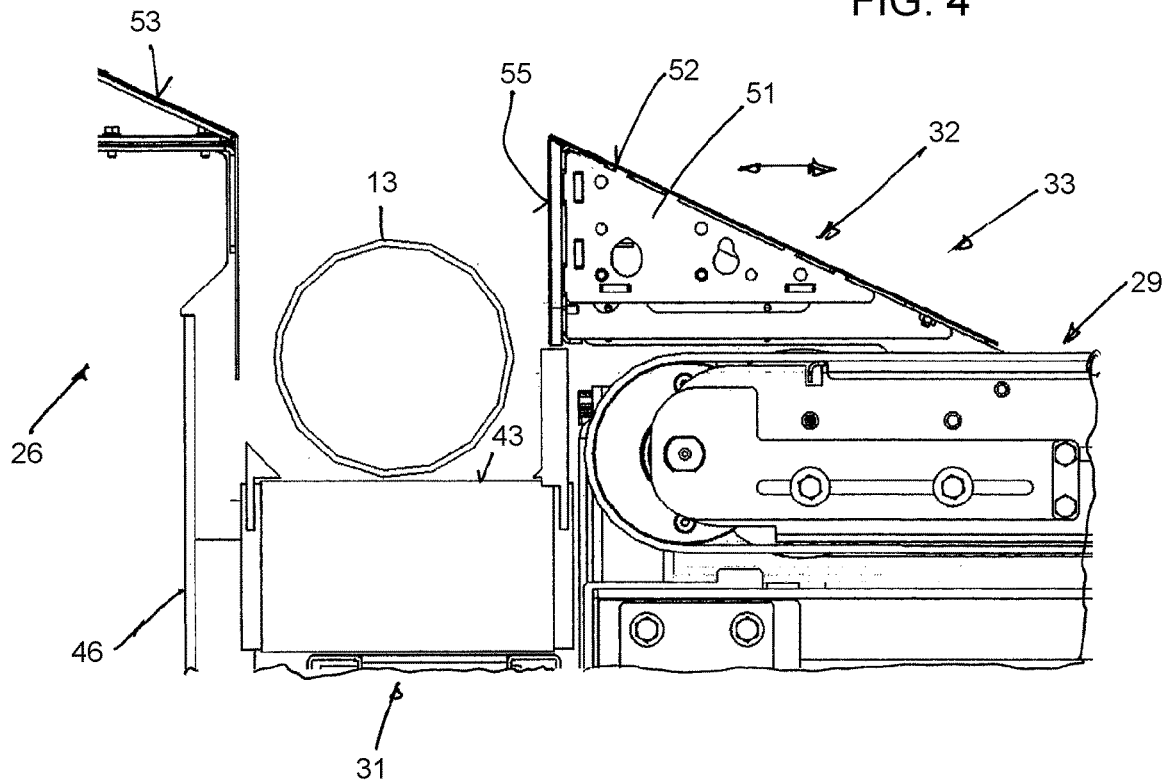
FIG. 5 shows a schematic sectional view of the discharging installation according to FIG. 4 in a discharging position.

The discharging installation 28 is provided in a discharging position 33 in FIG. 5. In this discharging position 33 the stop beam 51 is displaced to the right so that the latter partially obscures the workpiece support 29. A stop face 55 is provided on the stop beam 51. Said stop face 55 is preferably aligned in the vertical direction. This stop face 55 is aligned with the longitudinal conveyor installation 31 and preferably aligned so as to be orthogonal to the transport plane of the revolving transport belt 43. This stop face 55 blocks a transfer of the workpiece 13 onto the workpiece support 29. Instead, the workpiece 13 is positioned on the longitudinal conveyor installation 31. The workpiece 13 can subsequently be moved out of the unloading station 15 by actuating the transport belt 43. In this embodiment it can be provided that the longitudinal conveyor installation 31 is disposed so as to be stationary at a predetermined height.

Figure 6:
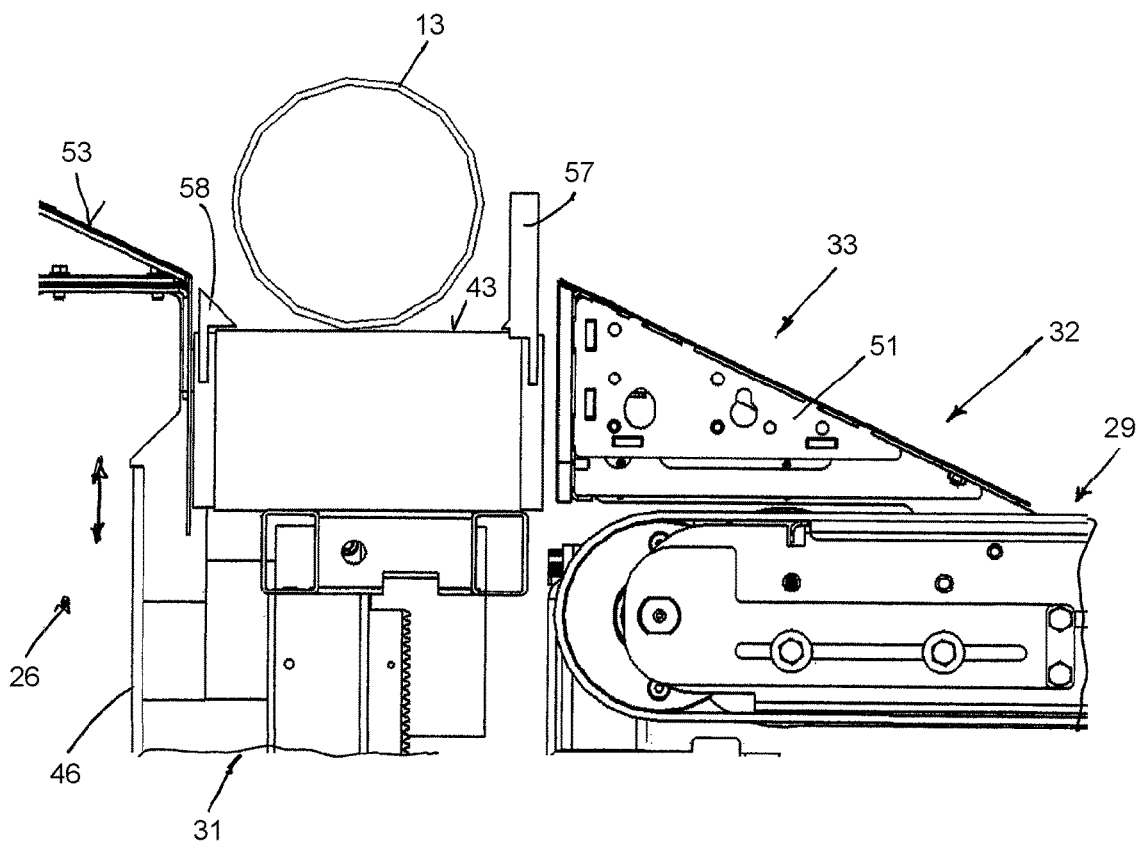
FIG. 6 shows a schematic sectional view of an alternative embodiment of the discharging installation according to FIGS. 4 and 5.

FIG. 6 illustrates an alternative embodiment of the discharging installation 28 according to FIGS. 4 and 5. In this embodiment it is provided that the longitudinal conveyor installation 31 is configured so as to be displaceable in terms of height. A stop 57 is preferably positioned on the longitudinal conveyor installation 31. This stop 57 is fixedly disposed on the longitudinal conveyor installation 31, so as to face the workpiece support 29. As a result, it can be made possible that the workpiece 13 is transferred exclusively in a rolling manner from the delivery face 53 onto the longitudinal conveyor installation 31, for example. Additionally, a gap bridging element 58 can be provided on the longitudinal conveyor installation 31, so as to face the delivery face 53.

The height adjustability of the longitudinal conveyor installation 31 can also be provided in the further embodiments.

Figure 7:
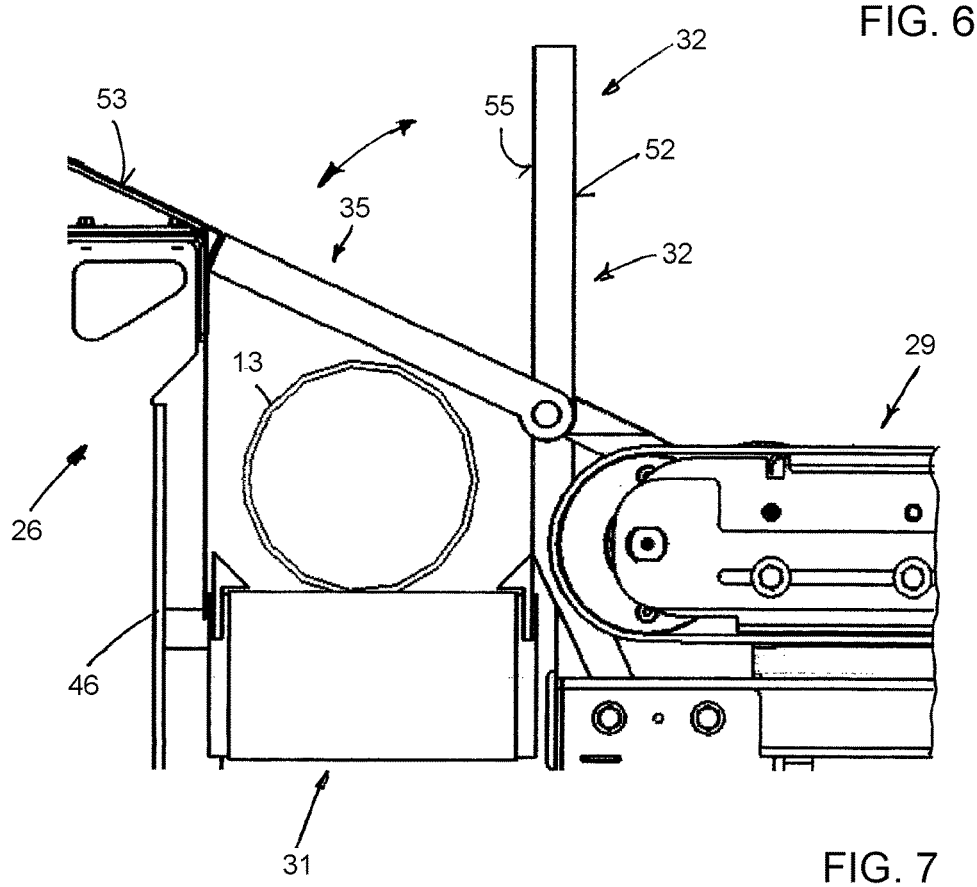
FIG. 7 shows a further alternative embodiment of the discharging installation according to FIGS. 4 and 5.

FIG. 7 illustrates a further alternative embodiment of the workpiece turnout 32. In this embodiment the workpiece turnout 32 is provided as a pivotable flap. Provided on an upper side of the pivotable flap is the guide face 52 which in a closed position 35 closes the gap between the delivery face 53 and the workpiece support 29. In a discharging position 33, a lower face of the pivotable flap forms a stop face 55 so that the machined workpiece 13 to be discharged is transferred so as to be supported on the longitudinal conveyor installation 31.

Figure 8:
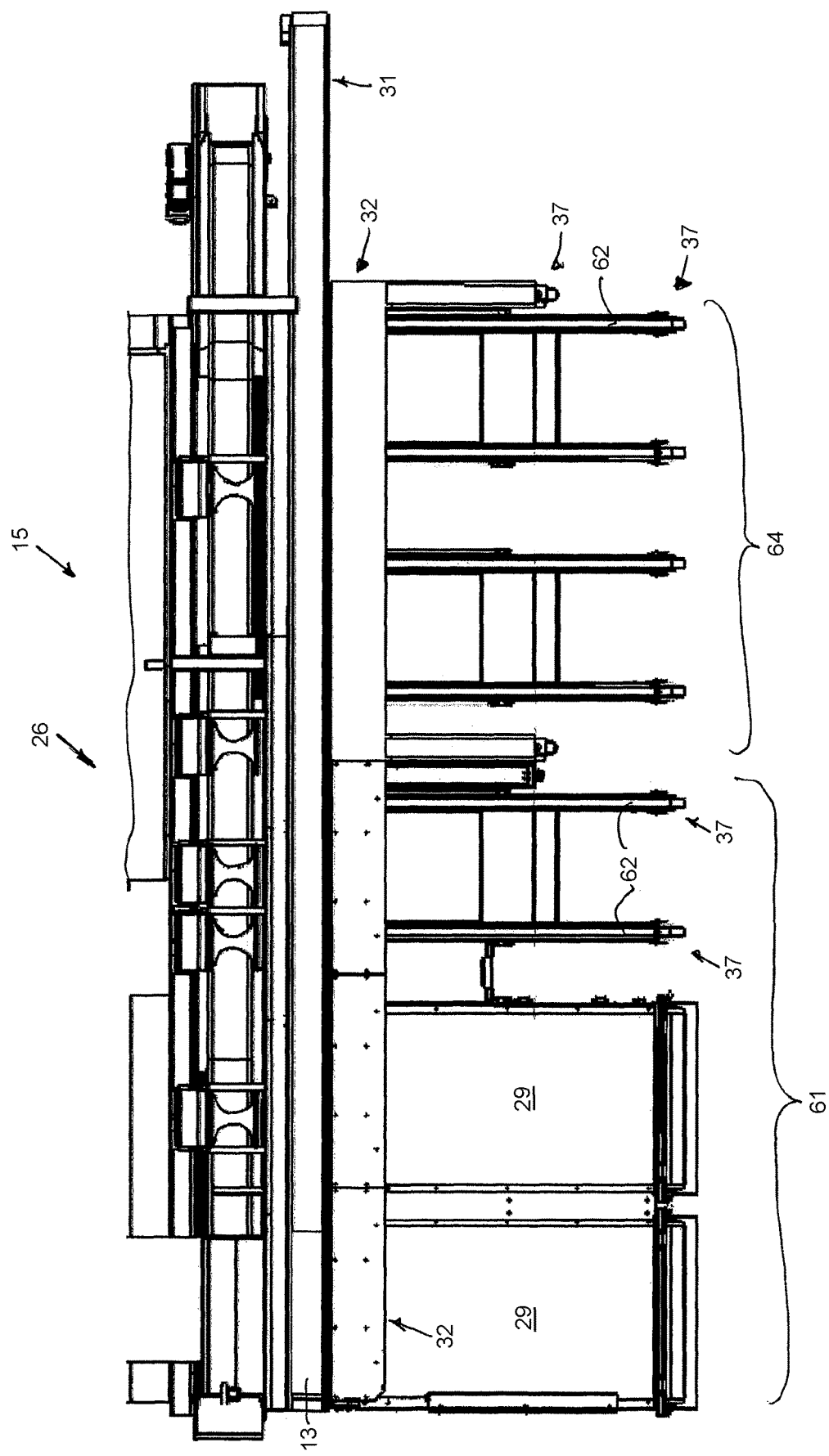
FIG. 8 shows a schematic view onto an unloading station having a plurality of modules of discharging installations.

FIG. 8 illustrates a schematic view from above onto the unloading station 15. In the case of an unloading installation 26 of a very long configuration, the discharging installation 28 may be adaptable thereto by way of a modular construction. A basic module 61 is provided, for example. This basic module 61 is composed of two mutually contiguous workpiece supports 29 and a workpiece turnout 32 and the longitudinal conveyor installation 31. Workpiece support portions 62, which are reduced in terms of the face and can be provided on an upper side of guides 37, for example, can be provided so as to be adjacent to the workpiece supports 29. In the case of comparatively long workpieces 13 it is no longer necessary for support across the entire face to be provided, as is the case in the workpiece support 29. An add-on module 64 can be provided in order for the discharging installation 28 to be adapted to different lengths of the unloading installation 26. This add-on module 64 can again comprise the workpiece turnout 32 and guides 37 on which the workpiece turnout 32 is guided. Additionally, one workpiece support portion 62 can in each case be provided on the guides 37. The workpiece turnout 32 of the basic module 61 and of the add-on module 64 are connected to one another so that a common displacement movement between the closed position 35 and the discharging position 33 is provided.

A variant of a longitudinal conveyor installation 31 is in each case illustrated in a front view in FIGS. 9A and 9B. According to this variant, an unloading-proximal end 312 of the longitudinal conveyor installation 31 is configured so as to be height-adjustable so that workpieces 13 by means of the transport belt 43 can be transferred in a simple manner at different heights to a downstream transport or storage unit (e.g., a pallet, a stanchion rack, or similar). The unloading-proximal end 312 of the longitudinal conveyor installation 31 can preferably coincide with an unloading-proximal longitudinal end of the transport belt 43. FIG. 9A shows the longitudinal conveyor installation 31 in a basic state in which the transport belt 43 is aligned so as to be substantially horizontal. FIG. 9B shows the longitudinal conveyor installation 31 in an inclined state. The transport belt 43 by means of a lifting device 316 is lifted at an unloading-proximal bearing point, while said transport belt 43 at a rotary bearing 314 disposed proximal to the machining remains at the original height.

The invention claimed is:

1. An unloading station for a metal-cutting station for cutting tubular or bar-shaped workpieces, the unloading station comprising:
 an unloading installation configured to receive processed workpieces following processing in the metal-cutting station;
 a discharging installation for selectively discharging the processed workpieces from said unloading installation; and
 at least one workpiece support configured to receive the at least one processed workpiece to be transferred from said unloading installation;
 said discharging installation including a longitudinal conveyor installation that extends between said unloading installation and said at least one workpiece support and that is configured to convey processed workpieces in a longitudinal direction towards a discharge of the processed workpieces for delivery at an end of said longitudinal conveyor installation; and
 said discharging installation including a workpiece turnout configured to enable the processed workpiece delivered from said unloading installation to be selectively transferred into said longitudinal conveyor installation or onto said at least one workpiece support along a direction that is perpendicular to the longitudinal direction.

2. The unloading station according to claim 1, wherein said discharging installation is provided on one or both longitudinal sides of said unloading installation.

3. The unloading station according to claim 1, wherein said workpiece turnout has a guide face which, for transferring the workpiece from said unloading installation to said workpiece support, closes a gap formed by said longitudinal conveyor installation.

4. The unloading station according to claim 3, wherein said workpiece turnout is configured as a stop beam which extends at least partially along said unloading installation and which is displaceable relative to said workpiece support.

5. The unloading station according to claim 4, wherein said stop beam comprises the guide face and a stop face and wherein, in a closed position relative to said longitudinal conveyor installation, said guide face closes said gap, and in a discharging position of said stop beam said stop face transfers the workpiece into said longitudinal conveyor installation.

6. The unloading station according to claim 4, wherein said stop beam has a triangular cross section shape, said stop face is aligned vertically and said guide face slopes downward from a highest point of said stop face.

7. The unloading station according to claim 6, wherein said a triangular cross section is a right-angled triangle.

8. The unloading station according to claim 4, wherein said stop beam is movably mounted for displacement by guides that extend orthogonally to a longitudinal side of said unloading installation.

9. The unloading station according to claim 8, wherein said guides are contiguous to said at least one workpiece support or are positioned between two respectively adjacent said workpiece supports.

10. The unloading station according to claim 8, wherein said guides have at least one workpiece support portion relative to which said stop beam is displaceable.

11. The unloading station according to claim 1, wherein said workpiece turnout is conjointly formed with at least one workpiece support and guides as a basic module, and wherein at least one extension module is provided which comprises a workpiece turnout of a predetermined length and at least two guides.

12. The unloading station according to claim 1, wherein said workpiece turnout is a pivotable flap configured to be positioned between said longitudinal conveyor installation and said workpiece support.

13. The unloading station according to claim 12, wherein an upper side of said pivotable flap is formed as a guide face for closing a gap between said longitudinal conveyor installation and said at least one workpiece support, and a lower side of said pivotable flap is formed as a stop face for blocking a transfer of the workpiece onto said at least one workpiece support.

14. The unloading station according to claim 1, wherein said longitudinal conveyor installation is height-adjustable and displaceable in a height direction.

15. The unloading station according to claim 14, wherein said longitudinal conveyor installation has a stop which, in terms of height, is displaceable conjointly with said longitudinal conveyor installation to maintain a contiguous relationship between said conveyor installation and said workpiece support.

16. The unloading station according to claim 1, wherein said unloading installation has assembly interfaces along a longitudinal side thereof for mounting at least one of said longitudinal conveyor installation, said guides, or said at least one workpiece support.

17. A metal-cutting machine for bar-shaped or tubular workpieces, comprising:
   a loading station for receiving the workpiece to be machined and for supplying the workpiece to a metal-cutting station for machining;
   an unloading station according to claim 1 disposed downstream of the metal-cutting station in a workflow direction and configured to receive the workpiece after having been machined.

18. An unloading station for a metal-cutting station for cutting tubular or bar-shaped workpieces, the unloading station comprising:
   an unloading installation configured to receive workpieces guided out of the metal-cutting station;
   a discharging installation for selectively discharging workpieces from said unloading installation; and
   at least one workpiece support configured to receive the at least one workpiece to be transferred from said unloading installation;
   said discharging installation including a longitudinal conveyor installation that extends at least between said unloading installation and said at least one workpiece support; and
   said discharging installation including a workpiece turnout configured to enable the workpiece delivered from said unloading installation to be selectively transferred into said longitudinal conveyor installation or onto said at least one workpiece support;
   said workpiece turnout having a guide face which, for transferring the workpiece from said unloading installation to said workpiece support, closes a gap formed by said longitudinal conveyor installation, and said workpiece turnout being configured as a stop beam which extends at least partially along said unloading installation and which is displaceable relative to said workpiece support.

* * * * *